Figure 1:
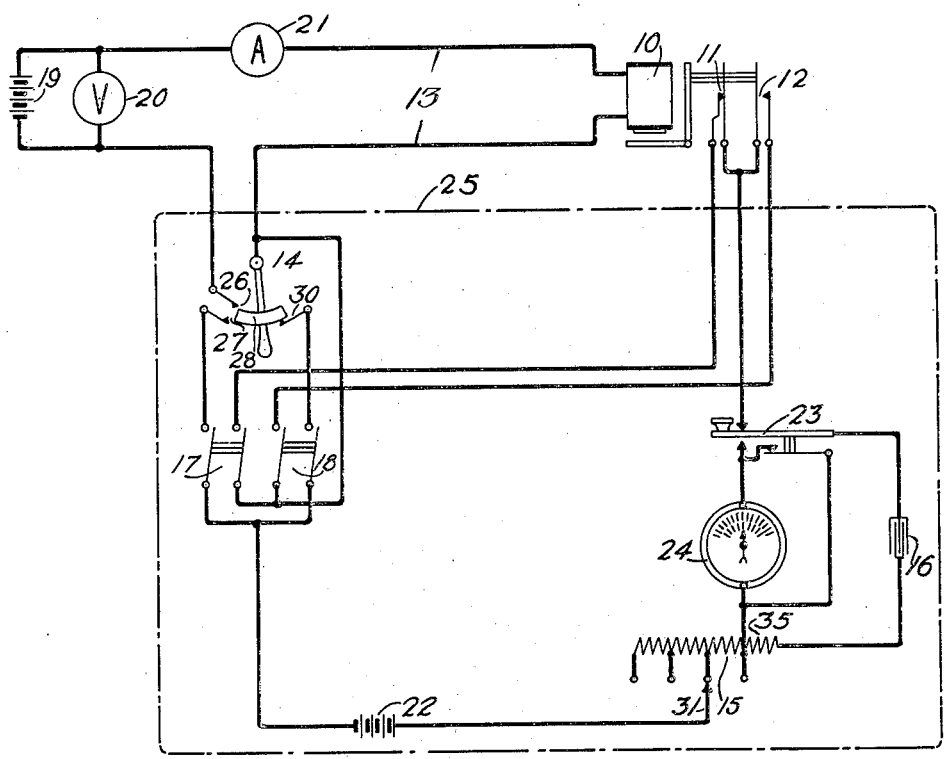

Nov. 10, 1925.

J. R. FRY 1,561,225

METHOD AND MEANS FOR MEASURING TIME

Filed March 11, 1924

Inventor:
Jacob R. Fry
by  E.W. Adams  Atty.

Patented Nov. 10, 1925.

1,561,225

UNITED STATES PATENT OFFICE.

JACOB R. FRY, OF NEW YORK, N. Y., ASSIGNOR TO WESTERN ELECTRIC COMPANY, INCORPORATED, OF NEW YORK, N. Y., A CORPORATION OF NEW YORK.

METHOD AND MEANS FOR MEASURING TIME.

Application filed March 11, 1924. Serial No. 698,472.

*To all whom it may concern:*

Be it known that I, JACOB R. FRY, a citizen of the United States, residing at New York city, in the county of Bronx and State of New York, have invented certain new and useful Improvements in Methods and Means for Measuring Time, of which the following is a full, clear, concise, and exact description.

This invention relates to a method and apparatus for measuring small time intervals, and particularly to measuring the time it takes a circuit or relay to function after it has been energized or deenergized.

An object of the invention is to provide a simple device that functions with extreme accuracy and by means of which readings can be obtained quickly with the minimum adjustments or manipulations of the device.

Another object is to provide a device of this type capable of measuring with absolute accuracy, time intervals of different circuits or relays in which the increments of time to be measured vary through a wide range.

Another object is to provide means whereby increments of time may be clearly read or indicated with the same accuracy throughout a wide range of time intervals.

To attain these objects, advantage is taken of the fact that a definite relation exists between voltage and time in an electrical circuit containing capacity and resistance and in accordance with one feature of this invention, a device is provided whereby the operating time of a circuit or a relay may be measured by the closing of a circuit including a resistance and a condenser in series, simultaneously with the closing of a circuit for a relay and then opening the condenser and resistance circuit when the relay is operated. By this means, the charge accumulated on the condenser may be measured in terms of time by allowing it to discharge to a galvanometer.

Another feature is the provision of means in a device of this type whereby the releasing time of a relay may be measured by closing the circuit including a resistance and condenser the moment the circuit for the relay is opened and opening the circuit for the resistance and condenser the moment the relay releases. By this means the condenser when discharging through the galvanometer indicates the releasing time of the relay in the same manner as the operating time of the relay was indicated.

Another feature of the invention is the provision of an adjustable resistance in series with the condenser for the purpose of adjusting the device so as to secure easily read indications on the galvanometer regardless of the length of the time intervals measured. That is, if the time interval is relatively small, the resistance will be adjusted to permit an appreciable charge to accumulate on the condenser whereas if the time interval is larger, an appropriate decrease of the charge may be secured by a corresponding adjustment.

Figure 2:
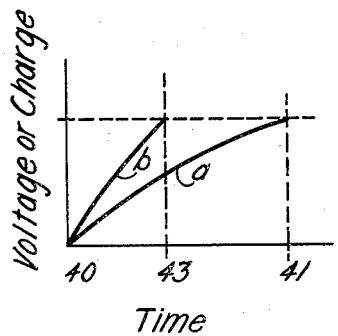

This invention may be described in connection with the accompanying drawing in which:

Fig. 1 shows a circuit arrangement embodying the invention as applied to the measuring of the performance characteristics of a relay and Fig. 2 shows a curve illustrating that the same charge on a condenser may be made to indicate different time intervals.

Referring now to Fig. 1, 10 represents a relay, the operating or releasing time of which is to be measured. This relay 10 may be provided with a pair of normally closed contacts 11 that enter into the function of the system when the operating time of the relay is to be measured, and a pair of normally open contacts 12 that enter into the function of the system when the releasing time of the relay is to be measured, as hereinafter described. A circuit 13 is provided for the energizing or deenergizing of the relay 10 by means of a two-position switch 14. This switch 14 in one position closes circuit 13 simultaneously with the closing of a second circuit for a resistance 15 and a condenser 16 when a switch 17 is in operated position to measure the operating time of the relay 10, and opens the circuit 13 and closes a third circuit for the resistance 15 and condenser 16 when a switch 18 is in operated position to measure the releasing time of the relay 10. A battery 19 is provided for circuit 13 to furnish the necessary operating current for relay 10, and a voltmeter 20 and an ammeter 21 are provided in this circuit to ascertain the electrical characteristics of circuit 13 as is well known in the art. The circuit for the resistance 15 and condenser 16 is provided with a separate battery 22 and this circuit is connected through the contacts 11 and 12 as shown and through a key 23 provided to switch the resistance 15 and condenser 16 in circuit with a galvanometer 24 that indicates the operating or releasing time of the relay 10 as hereinafter described.

The apparatus enclosed by the dotted line 25 may preferably be arranged in a separate container or box suitable for use in the laboratory for the testing of individual relays or circuits or for use in the field for the testing of relays or circuits already installed that may require adjustment.

The operation of the device will now be described. If it is desired to measure the operating time of relay 10, the switch 17 is operated to close its contacts, and switch 14 is moved toward the left until contacts 26 and 27 engage contact block 28 of switch 14 and it is essential that the contacts of switch 14 should close simultaneously so that the circuit for relay 10 is closed at the same time as the circuit for resistance 15 and condenser 16; i. e., so that the condenser 16 will begin to receive a charge from battery 22 at the same instant as the current from battery 19 begins to flow through the winding of relay 10. When now relay 10 operates and attracts its armature, contact springs 11 are separate, thus opening the circuit for resistance 15 and condenser 16 and causing the charging of condenser 16 to be discontinued. It is therefore evident that condenser 16 only receives a charge from the moment current is applied to relay 10 until it is operated. If now key 23 is operated to close the circuit for the resistance 15 and condenser 16 through the galvanometer 24, the value of the charge on the condenser 16 through the galvanometer may be read and interpreted to indicate the time of operation of relay 10.

If on the other hand the releasing time of relay 10 is to be measured, switch 17 and key 23 are returned to normal and switch 18 is operated to close its contacts, while switch 14 is moved from its former position toward the right so as to connect the contact spring 30 with block 28 at the same instant that the contact 26 leaves block 28. A circuit for resistance 15 and condenser 16 is thereby closed simultaneously with the opening of the circuit for relay 10. The condenser 16 therefore begins to receive a charge the moment the circuit for relay 10 is opened, and when relay 10 releases contacts 12 are opened breaking the circuit for resistance 15 and condenser 16 and discontinue the charging. This charge on condenser 16 may now be measured in the same manner as when the operating time of the relay was measured, that is, by permitting it to discharge through the galvanometer by the operation of key 23.

The galvanometer 24 may be calibrated so that the deflection of its needle will indicate the value of the discharge of condenser 16 in time units, and the performance characteristics of the relay 10 may therefore be expressed directly in terms of time.

To measure the operating characteristics of different type relays the resistance 15 is arranged so that its value in the circuit with condenser 16 may be readily changed. A pointer 31, is provided for this purpose that may be moved to any one of the contacts on the resistance as shown. By this means the same deflection of the needle of the galvanometer 24 may be obtained for different increments of time and thereby the same accuracy secured throughout a wide range of increments. Thus time intervals of operation or release of relays having different operating characteristics may also be measured by this device. For example, if a relay having very fast operating characteristics is to be measured, the pointer 31 is moved toward the right so that the condenser 16 is charged at a comparatively rapid rate to obtain a correspondingly large deflection of the needle when the condenser is later discharged through the galvanometer. On the other hand, if a relay having comparatively sluggish operating characteristics is to be measured, the pointer 31 is moved toward the left so that the condenser 16 is charged at a slower rate and the needle is deflected a correspondingly shorter distance when the condenser is discharged through the galvanometer. It should be understood that if the pointer 31 is so moved, different scales provided on the galvanometer are read; i. e., a different scale should be provided for each contact on the resistance 15 to indicate a corresponding group of time units.

The portion 35 of the resistance 15 is shown as permanently connected in series with the condenser 16 to a sufficiently slow discharge of the condenser to permit the galvanometer to respond with the required accuracy. The circuit for normally short-circuiting the galvanometer is to prevent the galvanometer needle from returning to normal position too rapidly when the key 23 is restored to normal after a discharge through the condenser has taken place.

To clearly illustrate in graphic form how the same charge on the condenser 16 can be interpreted to represent different time intervals, Fig. 2 has been prepared. In this figure, the curve A represents the rate at which the condenser charges when a relay having comparatively slow acting characteristics is measured and at which time the pointer 31 is placed at a certain position on resistance 15, for example, at the point shown in the drawing, to include a large amount of resistance in the charging circuit while the distance between the point 40 and the vertical line 41 represents the time it takes this charge to accumulate. A certain scale on the galvanometer corresponding to this position of the pointer 31 would in this case have to be read. On the other hand, curve B may represent the same charge on the condenser when a relay having a comparatively quick acting characteristic is measured and the distance between the part 40 and the vertical line 43 would thus represent the time interval which would have to be read on a certain other scale when the pointer 31 is moved toward the right to another point on resistance 15 which would correspond to that of another scale. In other words, a certain position of the pointer 31 determines which scale is to be read, irrespective of whether the charge on the condenser is the same and the needle of the galvanometer is deflected to the same position for two or more relays having different operating characteristics.

It should be understood that this invention is not confined to this particular disclosure but that many other forms thereof may be made without departing from the spirit thereof such as for example an arrangement wherein a standard known charge is present normally on the condenser and the performance characteristics of the circuit or relay are indicated by the amount remaining on the condenser after it has been allowed to discharge for the time interval to be measured.

What is claimed is:

1. A method of measuring time intervals which consists in initiating the charging of a condenser at the beginning of the energization of a relay and terminating the charging of the condenser at the operation of the relay, and measuring the charge accumulated by the condenser.

2. A method of measuring time intervals which consists in measuring the quantity of electrical energy stored in a condenser from the time a circuit that has caused the energization of a relay is broken until the relay is subsequently released.

3. A method of measuring time intervals which consists in initiating the charging of a condenser at the time an energizing circuit for a relay is broken, terminating the charging of the condenser when the relay is released and measuring the charge accumulated by the condenser.

4. A system for measuring time intervals comprising a relay, an energizing circuit therefor, a condenser, a circuit therefor, means for simultaneously closing said circuits, means for opening the circuit for the condenser, the moment the relay operates, and means for measuring the charge accumulated by the condenser.

5. A system for measuring time intervals comprising a relay, an energizing circuit therefor, a circuit including a condenser and resistance in series, means for simultaneously closing said circuits, means for opening the circuit including the condenser and resistance the moment the relay operates, and means for measuring the charge accumulated by the condenser.

6. A system for measuring time intervals comprising a relay, an energizing circuit therefor, a circuit including a condenser and an adjustable resistance, means for simultaneously closing said circuits, means for opening the circuit including the condenser and resistance the moment the relay is operated, and means for measuring the charge accumulated by the condenser.

7. A system for measuring time intervals comprising a relay, an energizing circuit therefor, a condenser, a circuit for the condenser, a switch for closing the circuit for the condenser at two points, a second switch for simultaneously closing both circuits at another point, a third switch under control of said relay for opening the circuit for the condenser at a fourth point when said relay operates, and means for measuring the charge accumulated by the condenser between the closing of the second and opening of the third switch.

8. A system for measuring time intervals comprising a relay, an energizing circuit therefor, a condenser, a circuit for the condenser, a switch for closing the circuit for the condenser at two points, a second switch for simultaneously closing both circuits at another point, a third switch under control of said relay for opening the circuit for the condenser at a fourth point when said relay operates, a galvanometer, and a fourth switch for opening the circuit for the condenser at a fifth point and closing said circuit to include the galvanometer so that a discharge of the condenser may take place therethrough.

9. A system for measuring time intervals comprising a relay having contacts that open when the relay is operated, an energizing circuit for said relay, a condenser, means for charging the condenser beginning at the closing of the energizing circuit for the relay and terminating at the opening of the contacts, and means for measuring the charge accumulated by the condenser.

10. A system for measuring time intervals comprising a relay, an energizing circuit therefor, a condenser, a circuit therefor, means for simultaneously opening the circuit for the relay and closing the circuit for the condenser, means for opening the circuit for the condenser the moment the relay releases, and means for measuring the charge accumulated by the condenser.

11. A system for measuring time intervals comprising a relay, an energizing circuit therefor, a circuit including a condenser and a resistance in series, means for simultaneously opening the circuit for the relay and closing the circuit including the condenser and resistance, means for opening the circuit including the condenser and resistance the moment the relay releases, and means for measuring the charge accumulated by the condenser.

12. A system for measuring time intervals comprising a relay, an energizing circuit therefor, a circuit including a condenser and an adjustable resistance in series, means for simultaneously opening the circuit for the relay and closing the circuit including the condenser and resistance the moment the relay releases, and means for measuring the charge accumulated by the condenser.

13. A system for measuring time intervals comprising a relay, an energizing circuit therefor, a condenser, a circuit therefor, a switch for closing the circuit for the condenser at two points, a second switch for simultaneously opening the circuit for the relay and closing the circuit for the condenser at another point, a third switch controlled by the relay to open the circuit for the condenser at a fourth point the moment the relay is released, and means for measuring the charge accumulated by the condenser between the opening of the circuit for the relay by the second switch and the opening of the circuit for the condenser by the third switch.

14. A system for measuring time intervals comprising a relay having contacts that open the moment the relay is released, an energizing circuit for such relay, a condenser, means for charging the condenser beginning at the deenergization of the relay caused by the opening of its circuit and terminating at the opening of the contacts thereof, and means for measuring the charge accumulated by the condenser during this period.

15. A system for measuring time intervals comprising a relay, an energizing circuit therefor, a condenser, means for charging the condenser during the time it takes the relay to operate after the energizing circuit is closed or during the time it takes it to release after the energizing circuit is broken, and means for measuring such charges and translating them into units of time indications.

16. A system for measuring time intervals comprising a relay, an energizing circuit therefor, a condenser, a charging circuit therefor, switching means that may be operated to close the charging circuit during the time it takes the relay to respond to the closure of the energizing circuit therefor or to close the charging circuit during the time it takes the relay to release after the energizing circuit therefor is broken, and means for measuring the charges accumulated by the condenser during such periods and translating them into units of time indications.

17. A system for measuring time intervals comprising a relay, an energizing circuit therefor, a condenser, a charging circuit therefor, switching means for closing the two circuits to cause the energization of the relay and the charging of the condenser to begin simultaneously, or for opening the energizing circuit and closing the charging circuit to cause the deenergization of the relay and the charging of the condenser to begin simultaneously, switching means for opening the charging circuit when the first switching means is set to cause the operation of the relay and when it is set to cause the release of the relay, and means for measuring the charge accumulated by the condenser in either instance, and translating said charges into units of time indications.

18. A system for measuring time intervals comprising a relay, a condenser, and means for measuring the operating characteristics of the relay by measuring the charges accumulated by the condenser in accordance with the said characteristics.

19. The method of interpreting charges accumulated by a condenser consisting in inserting resistances of definite values in series with the condenser to secure the same range of indications by one series of charges as by any other series of charges where each resistance value corresponds to a particular series of charges.

20. A method of interpreting charges of a condenser consisting in inserting a resistance of a definite value in series with a condenser corresponding to a definite range of increments of time during which the condenser may be charged and changing said resistance to correspond to a different definite range of increments of time to permit the accumulation of corresponding charges by said condenser.

21. A method of measuring time intervals which consists in measuring the operating characteristics of a relay by charges accumulated by a condenser in accordance with said characteristics, and inserting a resistance of a definite value in series with the condenser for a certain range of increments of time representing said operating characteristics and changing said resistance value to correspond to certain other ranges of increments of time to secure the same series of charges by said condensers.

22. A method of measuring time intervals which consists in measuring the quantity of electrical energy remaining stored in a condenser after it has discharged a portion of a standard charge thereon, where the discharge takes place from the time a current is applied until an operative effect is produced thereby.

23. A method of measuring time intervals which consists in initiating a discharge, of a condenser on which a certain charge is accumulated, at the beginning of the energization of a relay and terminating the discharging at the operation of the relay, and measuring the remaining charge on the condenser.

24. A method of measuring time intervals which consists in initiating a discharge, of a condenser on which a certain standard charge is accumulated, from the time the energizing circuit for a relay is broken, terminating the discharge when the relay is released, and measuring the remaining charge on the condenser.

In witness whereof, I hereunto subscribe my name this 29th day of February A. D., 1924.

JACOB R. FRY.